F. W. PEEK, Jr.
APPARATUS FOR PRODUCING A GASEOUS REACTION.
APPLICATION FILED JUNE 23, 1911.
1,041,340.
Patented Oct. 15, 1912.
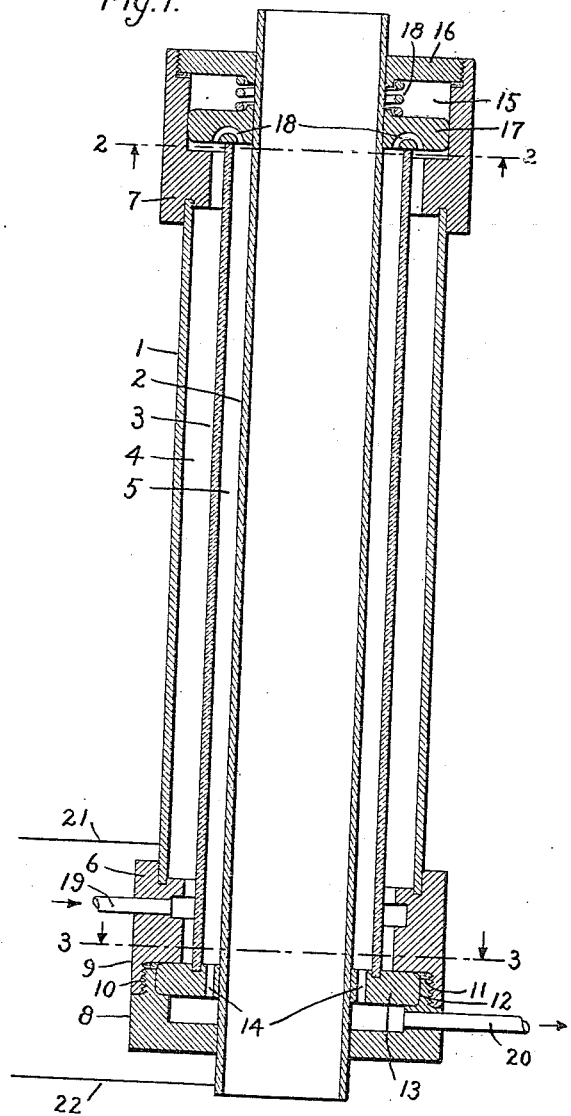
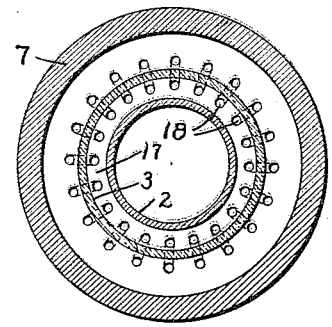
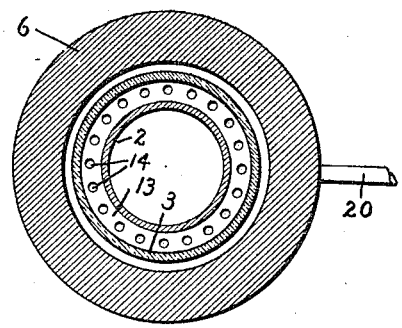
WITNESSES:
J. Earl Ryan
J. Ellis Glen
INVENTOR:
FRANK W. PEEK, JR.
BY Albert G. Davis
HIS ATTORNEY.

UNITED STATES PATENT OFFICE.

FRANK W. PEEK, JR., OF SCHENECTADY, NEW YORK, ASSIGNOR TO GENERAL ELECTRIC COMPANY, A CORPORATION OF NEW YORK.

APPARATUS FOR PRODUCING A GASEOUS REACTION.

1,041,340.

Specification of Letters Patent.

Patented Oct. 15, 1912.

Application filed June 23, 1911. Serial No. 634,985.

*To all whom it may concern:*

Be it known that I, FRANK W. PEEK, Jr., a citizen of the United States, residing at Schenectady, in the county of Schenectady, State of New York, have invented certain new and useful Improvements in Apparatus for Producing a Gaseous Reaction, of which the following is a specification.

My invention has reference to an apparatus for producing a gaseous reaction by what is known as a silent discharge, and is particularly applicable to the production of ozone. In a device of this character a static discharge takes place between electrodes between which is disposed a dielectric, and, when the electrodes are equally spaced apart throughout, there is a tendency for the static charge to concentrate at the edges of the electrodes, under which conditions the dielectric material is liable to be punctured.

One object of my invention is the provision of means for preventing this concentration of the static charge at the edges of the electrodes, and the consequent breakage of the dielectric material.

Other novel features of my invention will appear in the specification and be particularly pointed out in the claims.

My invention is illustrated in the accompanying drawings, in which—

Figure 1 is a longitudinal section of my device; Fig. 2 is a section on the line 2—2 of Fig. 1; and Fig. 3 is a section on the line 3—3 of Fig. 1.

In the drawing, 1 and 2 are the electrodes which are here shown as cylindrical in form and concentrically arranged, one of the electrodes being of greater diameter than the other. A dielectric 3, also cylindrical in form and preferably made of glass and having a diameter intermediate between those of the outer and inner electrodes, is also arranged concentrically with the electrodes so that spaces 4 and 5 are provided between the dielectric and the outer and inner electrodes respectively. The generator is supported in position from the inner electrode 2 which is longer than the rest of the ozone unit. The electrodes and the dielectric are held in position by two heads 6 and 7 which are provided with central openings which fit snugly over the inner electrode 2 and are held in position either frictionally as shown or by set screws or in any desirable manner. These heads are made of wood or porcelain or any desirable dielectric material. The lower head 6 is made in two sections 8 and 9 which may be conveniently secured together by a threaded joint 10 which is made air-tight by a suitable packing ring 11. The lower section 8 of the head is cored out at 12 to receive a plate 13. This plate, which is made of a conducting material, such as iron, together with the dielectric formed by the head 6, which is preferably made of a material having a better conductivity than does air, forms a path for the static charge between the edge of the electrode 1 and the electrode 2 which passes below the dielectric 3, thus relieving the edge of this dielectric from the static stress to which it would otherwise be subjected. The plate 13 is provided with an annular series of openings 14 near the inner electrode 2. The upper head 7 is cored out above at 15 and is inwardly threaded to receive a plug 16 which engages a packing ring and forms an air-tight joint with the head. A plate 17 made of conducting material fits snugly within the recess 15 and is yieldingly held by a spring 18 interposed between the plug 16 and the plate 17. The outer electrode 1 is received within suitable grooves in the heads 6 and 7 while the dielectric 3 is received within a groove in the lower plate 13 and fits tightly against the upper plate 17. The plate 17 is provided on its lower side with an annular series of openings 18 which enter the lower surface of the plate at points without the dielectric 3 and open at points on the lower surface of the plate within the dielectric 3. The plate 17 acts in the same way as the plate 13 to deflect the static charge from the edge of the dielectric 3. At the same time the plate 17 is always held tightly against the dielectric 3 by the spring 18. The spring thus compensates for changes in temperature in the dielectric and furnishes a yielding support for the same. Air or other gas which is to be acted upon is led into the ozone generator through a pipe 19 which enters the space between the outer electrode 1 and the dielectric, and a pipe 20, which communicates with the space between the inner electrode and the dielectric, carries away the ozone, or other gas which has been produced. Conductors 21 and 22 are electrically connected to the outer and inner electrodes respectively and are connected to any suitable source of electric energy for producing the desired static discharge between the electrodes, preferably to the secondary of a transformer.

The operation of my device is as follows: Air or other gas to be acted upon enters the generator through the pipe 19, from which it passes to the space 4 between the outer electrode and the dielectric 3. Within this space the air, in case of the production of ozone, is partially ozonized and passes on through the openings 18 to the space 5 between the inner electrode and the dielectric where the gases are again subjected to the discharge taking place between the electrodes and where the amount of ozone is still further increased. The ozone then passes through the openings 14 in the plate 13 to a recess below the plate and is led off by the pipe 20.

It will be understood that any desired means, such as a fan, or an injector, may be utilized for the purpose of producing the necessary movement of gases through the generator.

Water or air or any other desired cooling medium may be passed through the electrode 2 for the purpose of keeping the working parts of the generator at the desired temperature.

While I am not limited to the use of such materials for the electrodes, I have found that electrodes made from aluminum are suitable for the purpose of my invention, and have further found that by electrolytically coating the surfaces between which the discharge takes place, that is, the inner surface of the outer electrode and the outer surface of the inner electrode, with a layer of aluminum hydroxid, a very smooth durable surface is produced which is well suited for the purpose of my invention. It is also to be understood that, while I have shown my invention in connection with cylindrical electrodes, it is not limited to such form of electrodes, but is equally applicable to any electrodes between which the discharge space is substantially uniform.

What I claim as new, and desire to secure by Letters Patent of the United States, is:—

1. In an apparatus for producing a gaseous reaction by a silent discharge, a pair of electrodes between which a static discharge takes place, a dielectric located between said electrodes and means independent of the electrodes for preventing the concentration of a static charge between the edges of the electrodes.

2. In an apparatus for producing a gaseous reaction by a silent discharge, a pair of electrodes between which a static discharge takes place and a conducting member located adjacent the edges of the electrodes for preventing the concentration of a static charge between the edges of said electrodes.

3. In an apparatus for producing a gaseous reaction by a silent discharge, a pair of electrodes between which a static discharge takes place, a dielectric member disposed between the two electrodes and a conducting member arranged adjacent the edges of the electrode for preventing the concentration of a static charge between the edges of said electrodes.

4. In an apparatus for producing a gaseous reaction by a silent discharge, a pair of electrodes between which a static discharge takes place, a dielectric member arranged between the two electrodes and means for maintaining said dielectric member in position comprising a yieldingly supported conducting member engaging one end of the dielectric.

5. In an apparatus for producing a gaseous reaction by a silent discharge, a pair of concentrically arranged electrodes between which a static discharge takes place, a dielectric member arranged between the two electrodes, a stationary conducting member engaging one end of the dielectric member and a yieldingly supported conducting plate engaging the other end of the dielectric.

6. In an apparatus for producing a gaseous reaction by a silent discharge, a pair of electrodes between which a static discharge takes place having their discharge surfaces coated with aluminum hydroxid.

In witness whereof, I have hereunto set my hand this 21st day of June, 1911.

FRANK W. PEEK, JR.

Witnesses:
BENJAMIN B. HULL,
MARGARET E. WOOLLEY.